INVENTORS
CARL H. MOTZ
RUSSEL W. ANTHONY
BY Whittemore, Hulbert
& Belknap ATTORNEYS United States Patent Office 3,299,520
Patented Jan. 24, 1967

3,299,520
GEAR CHECKER
Carl H. Motz, Harper Woods, and Russel W. Anthony, Detroit, Mich., assignors to National Broach & Machine Company, Detroit, Mich., a corporation of Michigan
Filed Sept. 9, 1963, Ser. No. 307,611
12 Claims. (Cl. 33—179.5)

The present invention relates to a gear checker and more particularly, to a checker adapted to operate on a sequence of gears, to gauge these gears for predetermined characteristics, and to separate the gears of the groups in accordance with the observed characteristics.

It is an object of the present invention to provide apparatus of the character described, capable of effecting a rapid check of gears with a minimum of time lost in locating a new gear in checking relationship and in moving a checked gear out of the checking station.

It is a further object of the present invention to provide gear checking apparatus including relatively movable master gears moved apart a distance sufficient to permit passage of the blank of the same outside diameter as the gears being checked but which is devoid of teeth.

It is a further object of the present invention to provide gear checking apparatus as described in the preceding paragraph including a support for a master gear and a stop member movable simultaneously between a position in which both the stop member and the master gear are completely removed from the path of travel of work gears and are movable to a position in which the stop member is adapted to engage the outside diameter of a work gear to position it in predetermined relation between the movable master gear and a stationary cooperating master gear, and to move the movable master gear into full mesh with a work gear.

It is a further object of the present invention to provide, in gear checking apparatus of the type described in the preceding paragraph, an air cylinder for shifting said stop member and movable master gear between limiting positions including a relatively stiff spring engageable by means movable therewith only upon approach of the movable master gear and stop member to checking position to provide for rapid shifting of the stop member and movable master gear to a position adjacent the checking position and relatively slow movement of said stop member and movable master gear into checking position.

It is a feature of the present invention to provide a brake element engageable with the movable master gear in combination with means to release said brake element as the movable master gear moves into checking position.

Other objects and features of the invention will become apparent as the description proceeds, especially when taken in conjunction with the accompanying drawings, illustrating a preferred embodiment of the invention, wherein:

FIGURE 3 is a fragmentary plan view of the apparatus shown in FIGURE 1.

Figure 1:
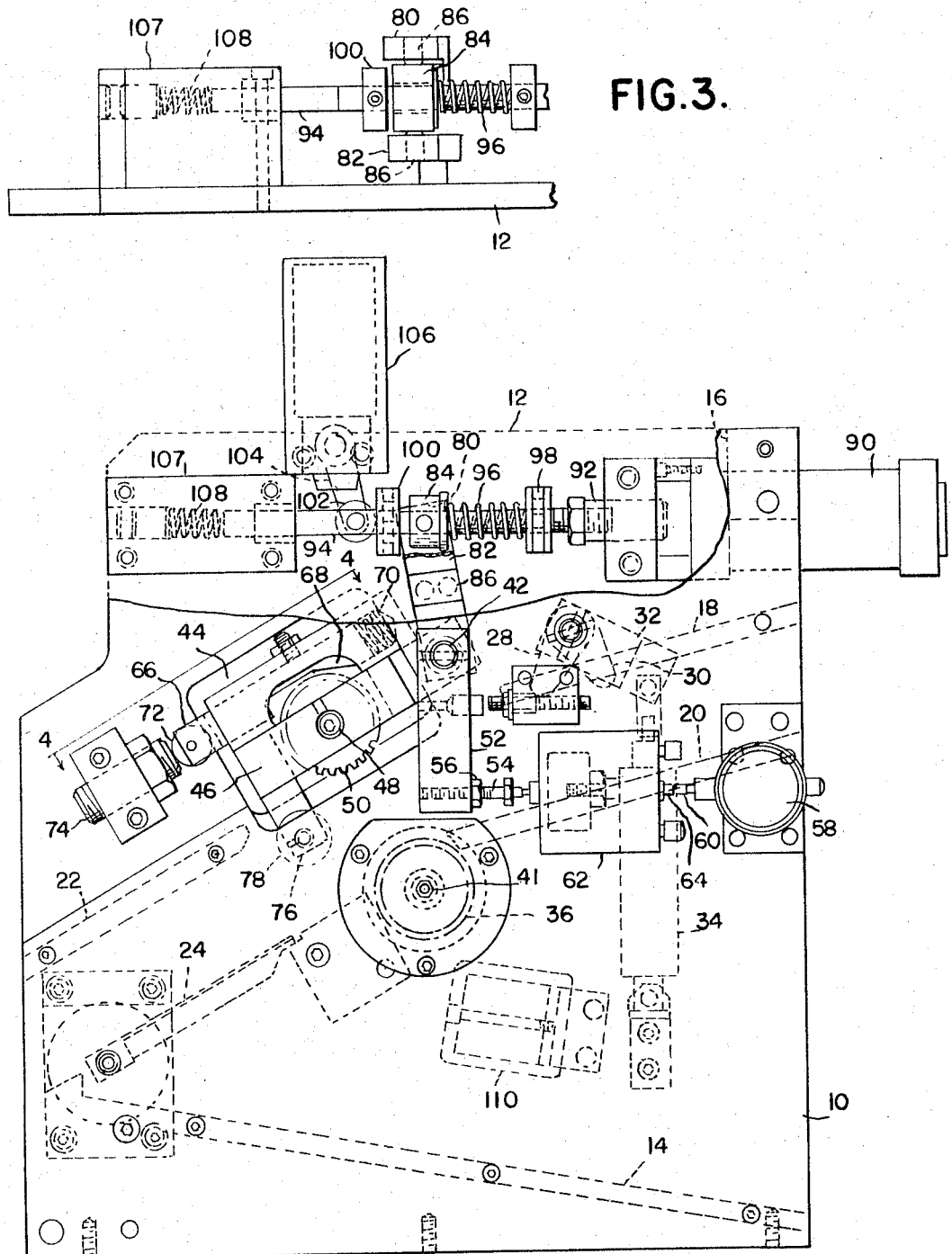
FIGURE 1 is a side elevation of the gear checking apparatus with parts broken away.
Figure 2:
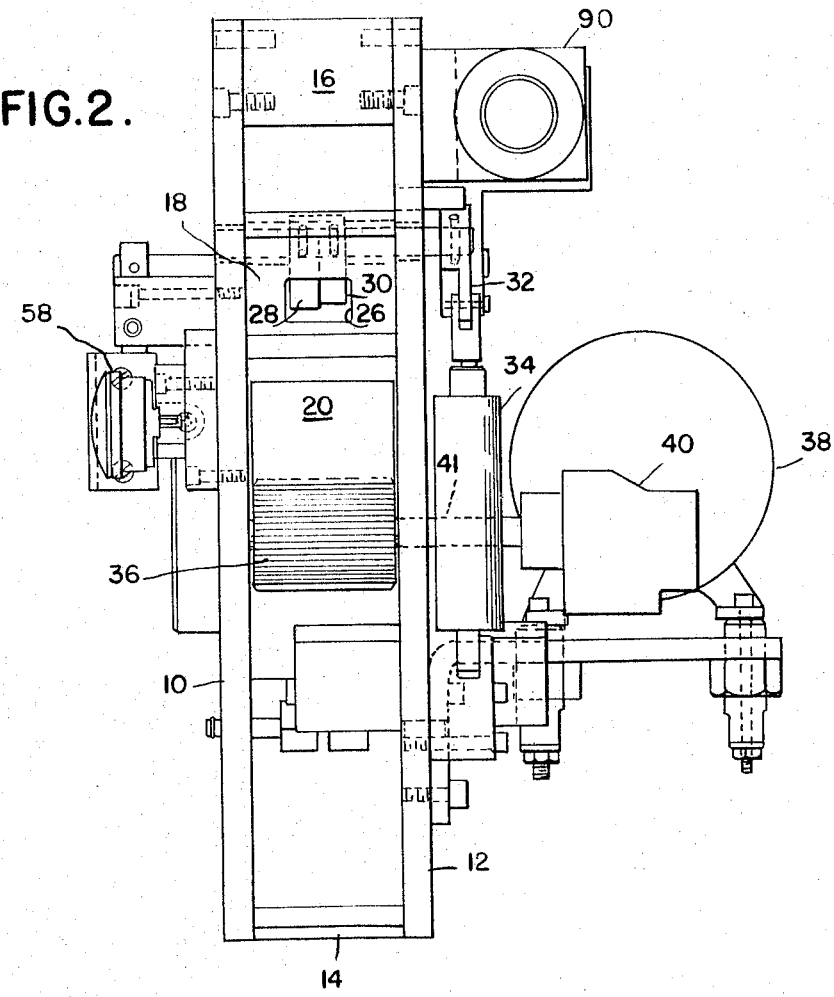
FIGURE 2 is an end view of the apparatus shown in FIGURE 1.

The gear checking apparatus is designed to receive a multiplicity of gears which are advanced to the apparatus in a chute and which are released one at a time for movement down the chute into position in mesh with a rotatable or driving master gear and for retention in this position by a suitable stop member. While in this position the work gear is driven in rotation and is engaged at the side thereof opposite the driving master gear with a second master gear resiliently urged into full mesh with the work gear. The position and/or movement of the second master gear during this operation is observed or gauged.

The apparatus comprises essentially structure mounted at the sides of and between a pair of plates 10 and 12 suitably connected together by several means including a bottom inclined plate or discharge chute 14 and an upper connector block 16, the top plate 18 of an upper inlet chute, the bottom plate 20 of the upper inlet chute, and a plate 22 cooperating with a movable outlet gate 24. The top plate 18 of the inlet chute is apertured as indicated at 26 and a pair of cooperating stop fingers 28 and 30 extend through the opening. The stop fingers are operated by a lever 32 connected to an air cylinder 34 and upon back and forth oscillation release a single gear for movement into the gauging zone.

Journaled between the plates 10 and 12 is a driving master gear 36. The master gear 36 is driven from a motor 38 through suitable speed reduction means 40 and shaft 41 and may be driven in continuous rotation or alternatively, may be driven throughout a cycle which includes movement of a work gear to the meshing zone and subsequent release of the work gear after it has been checked.

Means subsequently to be described measure certain gear characteristics while the gear remains in the meshing zone and the gears are separated in accordance with observed deviations if any, from the required characteristics. Separation may be into different numbers of categories, but for the present it is assumed that the gears are separated into satisfactory and unsatisfactory groups. If the gear is found to be satisfactory upon checking, the gate 24 may remain in the position illustrated in FIGURE 1, in which case the completed gear rolls over the gate 24 into a discharge chute connected thereto. If however, the gear is found to be unsatisfactory the gate 24 is actuated by suitable mechanism (not illustrated herein) so that the gate constitutes a stop and also uncovers an opening which permits the unsatisfactory gear to drop down onto the inclinde plate 14 where it rolls to the collection of unsatisfactory gears.

The means for checking the individual gears in the work zone comprises structure mounted on a main pivot shaft 42. A support body 44 is fixedly mounted to the shaft 42 and includes straps 46 providing a pivot shaft 48 carrying a movable master gear 50 which is thus movable about the axis of the shaft 42 and generally in an arc whose tangent is radial of the shaft 41.

Also fixed to the shaft 42 is an arm 52 having a headed screw 54 extending therefrom and locked in position by a lock nut 56. Mounted on the outer surface of the plate 10 is a suitable measuring instrumentality which may be a gauge 58 having a movable indicator plunger 60. Interposed between the adjacent screw 54 and the plunger 60 is a double limit electric switch 62 which is adapted to control the actuating mechanism for the gate 24 in accordance with the observed or measured characteristics of each work gear.

The switch 62 includes a movable element 64 engageable with the indicator plunger 60 so that the mechanism is adapted not only to effect automatic control of the cycle, but to afford an indication of the observed characteristics of the gear.

Longitudinally movable in the support body 44 is a brake element 66 having an inclined brake surface 68 engageable with the periphery of the movable master gear 50. The brake element 66 is received in an opening in which it is slidable and is urged downwardly and to the left toward a brake applying position by a compression spring 70. At its outer end the brake element 66 carries a roller 72 which is engageable with the end of an adjustable abutment screw 74. With the parts in the relationship illustrated in FIGURE 1 it will be observed that the screw 74 has moved the brake element 66 to a position out of engagement with the movable master gear 50.

The support body 44 also includes an extension 76 carrying a pair of locating rollers 78 adapted to engage the outer diameter or tooth crests of a work gear as it moves into the working zone in which its axis is substantially in alignment with the axes of the master gears 36 and 50.

Figure 4:
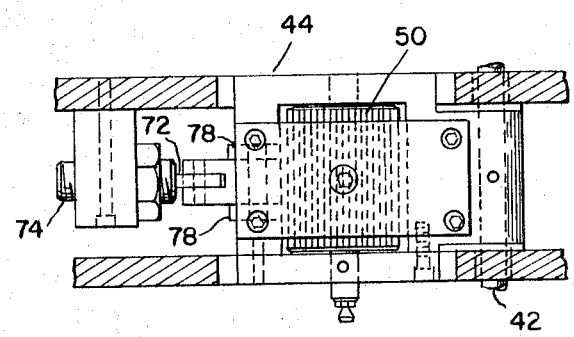
FIGURE 4 is a fragmentary section on the line 4—4, FIGURE 1.

As best seen in FIGURE 4, the stop rollers 78 are spaced apart substantially. The work gears for which this apparatus is designed are normally helical pinions and the use of properly dimensioned and spaced rollers provides smooth carryover so that the rotatable stop rollers are operable to position the work gear with sufficient accuracy in the operating zone for rotation with the master gears. It is accordingly unnecessary to provide for an arbor movable into and out of the central opening in the work gears after the work gear has reached operating position, as has previously been the case.

It is also contemplated that the locating rollers may be movable into a position such that the axis of the work gear moves very slightly beyond the plane containing the axes of the master gears. Also, it is of course to be understood that the direction of rotation of the driving master gear is such as to establish forces tending to maintain the parts in operating position rather than to disturb the operating relationship. It will further be observed that the location of the stop rollers is such that they will engage the periphery of each work gear substantially midway between or spaced approximately 90 degrees from the zones of engagement between the work gear and the two master gears.

The present checking apparatus is designed for automatically checking a series of gears rapidly and it is designed to permit the passage of work gear blanks which inadvertently have not been hobbed or cut, or at least have not been finished to full depth. For this purpose it is essential that the stop or locating rollers 78 and the movable master gear 50 shall move to a position which permits passage of a smooth cylindrical uncut gear blank. In order that this can be accomplished rapidly without slowing down the overall operation of the machine, it is desirable to shift the stop rollers 78 very rapidly from the operating position illustrated in FIGURE 1 to an upper clearance position and to shift them very rapidly from the upper clearance position to a position just short of the final operating position. Thereafter, the stop rollers are permitted to move slowly into accurately predetermined operating position.

In order to accomplish the foregoing function the main pivot shaft 42 is provided with an actuating arm 80 to the upper end of which is secured an offset arm portion 82. The two together constitute a yoke between which is supported a collar 84 by means of the oppositely projecting pins 86 respectively received in the arms of the yoke.

An actuating air cylinder 90 is posiitoned on the outside of the plate 12 and a piston therein is connected to a piston rod 92 carrying a piston rod extension 94. A relatively light coil spring 96 surrounds the rod extension 94 and engages the collar 84, the other end of the spring bearing against a spring seat 98 pinned to the rod extension 94. The spring 96 is a relatively light spring and is adapted to apply a torque to the arm 80 which determines the force with which the movable master gear 50 engages a work gear in the working zone.

Also keyed or otherwise secured to the rod extension 94 is a collar 100 adapted to engage a roller 102 carried by the actuating arm 104 of a switch 106.

The end of the rod extension 94 is movable in an opening formed in a block 107 and is engageable therein, as the rod approaches one end of its stroke with a relatively stiff spring 108.

Accordingly, since actuation of the mecanism connected to shaft 42 for rotation therewith is by an air cylinder, it will be appreciated that admission of air to the cylinder in a direction to move the associated structure clockwise about the axis of shaft 42 from the position shown in FIGURE 1, causes the structure to move relatively rapidly to the open or idle position since this movement is unopposed. Similarly, when the direction of air supplied to the air cylinder 90 is reversed, the parts move very rapidly to a position close to the final operating or checking position since this movement is also unopposed. However, just before the parts reach the final operating position the end of the rod extension 94 engages the spring 108. Thereafter, it is necessary for air pressure in the cylinder to build up to an amount sufficient to overcome the spring 108 and to move the parts into the final operating position. Thus, the operating characteristics of the checking apparatus includes abrupt movement of the stop rollers 78 and the movable master gear 50 to clearance position following each gear checking operation, and rapid return of these parts substantially to operating position during movement of the next succeeding gear into the operating zone. The parts are designed so that the stop rollers 78 and moveable master gear 50 are at or substantially at operating positions as the next succeeding gear to be checked reaches operating position. Thus, no time is lost. The finished work gear is completely released substantially instantaneously and rolls into a chute in accordance with its observed characteristics. At the same time the next succeeding gear is released and moves toward the checking station. Before it actually arrives in the final checking position the stop rollers 78 and movable master gear 50 are returned to or substantially to operating position for cooperation therewith.

Suitable automatic controls are provided such for example as the switch 106 previously described, the switch 62 for controlling the chute gate 24, and also a proximity switch 110 which senses passage of a gear along the discharge chute 14. Electrical circuitry of conventional character provides for actuation of the air cylinders 34 and 90 in properly timed relationship so as to provide for rapid checking of a multiplicity of gears with a minimum of delay between completion of one checking operation, movement of the next succeeding gear to the checking station, and initiation of a succeeding checking operation.

The drawings and the foregoing specification constitute a description of the improved gear checker in such full, clear, concise and exact terms as to enable any person skilled in the art to practice the invention, the scope of which is indicated by the appended claims.

What we claim as our invention is:

1. Apparatus for checking a continuous sequence of gears comprising a first rotatable master gear, a second rotatable master gear movable substantially toward and away from the first master gear, means for driving one of said master gears in rotation, stop and locating means engageable with the periphery of a work gear when meshed with both of said master gears with the axes thereof in substantial alignment effective to cooperate with the master gears to hold the work gear in operating position during rotation thereof in a 360° checking operation with sufficient accuracy as to eliminate the necessity for additional work gear support means, means for measuring relative movement between said master gears during rotation of a work gear in mesh therewith, and means operable between checking operations of successive gears to move said movable master gear and said stop means simultaneously into a clearance position which will permit passage of a cylindrical blank having the same outside diameter as the work gears being checked.

2. Apparatus as defined in claim 1 comprising a common movable support for said movable master gear and said stop means.

3. Apparatus as defined in claim 2 in which said stop means comprises roller means engageable with work gears at a point spaced substantially 90 degrees from the zones of mesh thereof with said master gears.

4. Apparatus as defined in claim 2 comprising an air cylinder device connected to said support for effecting rapid movement of said support from operating position to retracted position, and resilient means effective only upon approach of said support to operating position to oppose movement thereof and to therefore provide for slow movement of said stop means and movable master gear into operaing position.

5. Apparatus as defined in claim 4 comprising resilient means interposed between the air cylinder device and said common support so as to limit the radial force acting between the movable master gear and the work gear to the force exerted by said resilient means.

6. Gear checking apparatus comprising a frame, a first rotatable master gear mounted on said frame in a fixed position, a pivoted carrier on said frame, a second rotatable master gear on said carrier movable therewith in a path generally toward and away from said first master gear, inlet guide means for advancing a work gear in a direction perpendicular to its axis into a position in mesh with both of said master gears, discharge guide means at the opposite sides of said master gears for guiding a work gear following a checking operation away from said master gears in the same direction as its approach thereto, means for driving one of said master gears, means for measuring relative movement between said master gears during rotation of a work gear in mesh therewith, and movable stop and locating means having an operating position in which it is engageable with the periphery of a work gear in mesh with both master gears and having its axis in substantial alignment with the axes of said master gears and effective to cooperate with said master gears to hold the work gear in operating position during rotation thereof in a 360° checking operation with sufficient accuracy to eliminate the necessity for additional work gear support means as the work gear rotates as a result of its meshed engagement with the driven master gear.

7. Apparatus as defined in claim 6 in which said stop means comprises rollers.

8. Apparatus as defined in claim 6 in which said stop means is mounted on said carrier for movement with said second master gear on movement of said carrier.

9. Apparatus as defined in claim 6 comprising power means for actuating said carrier including means for moving said carrier abruptly from operating position to retracted position in which the master gear and the stop means carried thereby are completely removed from the path of work gears to permit movement of a checked work gear along the discharge guide means.

10. Gear checking apparatus comprising a frame, a first rotatable master gear mounted on said frame in fixed position, a carrier mounted on said frame for pivoting movement about a fixed axis, a second rotatable master gear on said carrier and movable therewith toward and away from said first master gear, means for driving one of said master gears in rotation, means for measuring relative movement between said master gears during rotation of a work gear in mesh therewith, an arm fixedly carried by said carrier, an air cylinder device having a longitudinally movable piston rod, a spring surrounding said rod operatively connected to said arm, and a second relatively stiff spring engageable by said rod only adjacent the end of a stroke thereof to oppose movement of the rod in a direction effective to move said second master gear into operating position.

11. Apparatus as defined in claim 10 comprising stop means on said carrier movable therewith into and out of a position in which it is engageable with the periphery of a work gear in mesh with both master gears.

12. Gear checking apparatus comprising a frame, a first rotatable master gear mounted on said frame in a fixed position, a carrier mounted on said frame for pivotal movement, a second rotatable master gear on said carrier and movable therewith in a direction toward and away from said first master gear and movable between an operating position adjacent said first master gear and a clearance position in which a blank of the same outside diameter as a work gear can pass between said master gears, means for driving one of said master gears in rotation, means for measuring relative movement between said master gears during roation of a work gear in mesh therewith, a brake element movably mounted on said carrier, resilient means urging said brake element into braking engagement with the periphery of said second master gear, and means operable upon movement of said carrier into operating position in which a work gear is in mesh with both master gears to shift said brake element into clearance position with respect to said second master gear.

References Cited by the Examiner
UNITED STATES PATENTS

| | | | |
|---|---|---|---|
| 2,761,560 | 9/1956 | Pomernacki | 33—179.5 X |
| 2,944,343 | 7/1960 | Anthony | 33—179.52 |
| 3,099,882 | 8/1963 | Gates | 33—179.52 |

LEONARD FORMAN, *Primary Examiner.*